United States Patent [19]
Paull et al.

[11] 4,007,832
[45] Feb. 15, 1977

[54] ELECTRONIC THERMOMETER

[75] Inventors: Seymour Paull, Natick; Michael J. Marino, Lynn, both of Mass.

[73] Assignee: Roi Corporation, Peabody, Mass.

[22] Filed: Apr. 10, 1975

[21] Appl. No.: 566,714

[52] U.S. Cl. .......................... 206/306; 73/362 AR
[51] Int. Cl.² ........................................ B65D 85/08
[58] Field of Search .............. 206/306, 69, 212; 73/362 AR; 220/72, 1 BC

[56] References Cited
UNITED STATES PATENTS

| | | | |
|---|---|---|---|
| 2,208,431 | 7/1940 | Rochow | 220/72 |
| 3,461,724 | 8/1969 | Tong et al. | 73/362 AR |
| 3,738,479 | 6/1973 | Sato | 206/306 |
| 3,880,282 | 4/1975 | Naumann | 206/306 |

*Primary Examiner*—William T. Dixson, Jr.
*Attorney, Agent, or Firm*—Wolf, Greenfield & Sacks

[57] ABSTRACT

The device is primarily adapted for use in hospitals and comprises a housing having a front window through which a digital display of sensed temperature is observed. The housing may receive one of preferably two probe holsters one of which has associated therewith a probe for oral use and the other of which has a probe for rectal use. Each probe holster is elongated in shape and has a passage for receiving a probe with the probe being fixedly wired into the holster so that the probe cannot be swapped between holsters. A holder is mounted on the top of the device and receives a cartridge of probe covers which are locked into the holder but are easily removed upon insertion of the probe into an individual cover. The holsters and associated probes are constructed to be autoclavable and gas sterilizable. The device is normally stored on a platform through which the batteries in the device are recharged between use of the device. The probe is of improved design and employs a thermistor sensor. The probe construction provides improved response time in sensing temperatures. The device of the present invention may be operated in essentially two different modes. For normal use the device is operable for a predetermined period of time to detect a peak temperature sensed at the end of the time period. In an alternate mode of operation the device can be operated continuously with continuous updating of the temperature sensed.

6 Claims, 11 Drawing Figures

ELECTRONIC THERMOMETER

BACKGROUND OF THE INVENTION

The present invention relates to an electronic thermometer which is preferably of the rechargeable type and which displays the sensed temperature in a digital manner. The present temperature also relates to an electronic thermometer having an improved probe construction wherein temperatures can be registered in relatively short periods of time.

The prior art electronic thermometers operate adequately but there are certain disadvantages associated with these devices. For example, the oral and rectal probes are both accommodated by the same probe receiving passage in the device thus presenting the possible problem of cross-infection. Furthermore, these prior art devices permit one to insert the probe into the device even when the cover is still on the probe. Thus, the probe with the used cover on it might be left in the device thereby causing further spreading of growth of infection.

The prior art electronic thermometers have a package of probe covers associated therewith which are normally carried by the nurse in her pocket. These packages of probe covers are easily spilled and easily contaminated as they usually are handled when inserted on the probe.

The prior art devices are also limited in their mode of operation. Usually these devices determine when the temperature has stabilized and record this as a reading. But in the prior art they did not provide alternate modes of operation. However, in accordance with this invention the device may be operated either in a one-shot manner or can be operated continuously.

Accordingly, one object of the present invention is to provide an improved electronic thermometer having as one of its unique features the use of a holster for the probe wherein the holster may be inserted and is removeable from the device so that a second holster and associated probe can be inserted into the device, the two probes being used for oral and rectal temperatures.

Another object of the present invention is to provide a device as set forth in the preceding object and which is autoclavable. Because the prior art devices did not teach the use of a holster for the probe the entire device had to be sterilized but the sterilization was limited to gas sterilization and the entire device could not be autoclavably sterilized.

A further object of the present invention is to provide an electronic thermometer having a holder associated therewith for receiving a cartridge of probe covers wherein the cartridge is received in a locked position and the probe covers are prevented from spilling from the holder.

Still a further object of the present invention is to provide an electronic thermometer having an easily read digital display panel and wherein the device is further provided with an audible and visual signal that indicates when the patient's temperature is to be read.

Another object of the present invention is to provide an electronic thermometer that is rugged in construction, uses solid state electronics, and is battery operated with a recharger and a storage stand.

A further object of the present invention is to provide an electronic thermometer that can be used to monitor in the usual manner where readings may be taken after, for example, a 30 second time interval, or where it can be used in a continuous manner to monitor a patient's temperature for applications in operating, recovery and intensive care situations.

Still another object of the present invention is to provide an improved cartridge for holding a plurality of probe covers wherein the cartridge may be opened in either of two different manners, which locks into the holder for the cartridge, and is yet easily removed once all of the probe covers have been used.

Still a further object of the present invention is to provide means for the operator to easily check the accuracy of the instrument so that even a relatively unskilled person can operate the device effectively.

SUMMARY OF THE INVENTION

To accomplish the foregoing and other objects of this invention, there is provided an electronic thermometer which is generally in the form of a housing in which is disposed the electronics of this invention and which has a front window through which a digital reading of temperature is observed. This housing may be maintained on a recharger platform when the device is not being used. In this connection the platform contains one part of a charging circuit with the other part of the charging circuit being disposed in the housing for charging rechargeable batteries in the housing which in turn operate the electronic circuitry. In use, the housing may be carried by means of a strap preferably placed around the neck of the nurse who is taking temperature readings.

The electronic thermometer also comprises a probe means including an elongated probe, conductor means extending from the probe, and a sensor which is responsive to the temperature of the human body. This probe means is at least partially disposed in a holster forming a chamber and specifically having an elongated passage for receiving the probe means. The housing and holster have mating connector means and the holster with the probe means inserted therein may be inserted in and removed from the housing so that an alternate holster and probe means can be inserted in its place, one being used for oral purposes and the other for rectal purposes. Preferably, the platform contains means for receiving the not used holster and associated probe means. The connector means is arranged so that the holster can be inserted into oppositely symmetrical positions either one of which is usable.

A holder is preferably associated with the housing and is for accommodating a cartridge of probe covers which have been folded to expose two adjacent rows of probe covers. When this cartridge is inserted into the holder it is held in place firmly and yet when all of the covers have been used, the cartridge can be easily withdrawn. Furthermore, provision is made for interlocking a second holder with the first holder thereby increasing the total number of probe covers that can be associated with the device.

One of the important features of the present invention is the use of this separate holster and probe which are together insertable into the device. The holder, holster and probe are constructed so that they can be autoclavable. Furthermore, the probe is designed using a metal probe and metal probe cover thereby providing excellent heat transfer from the human body to the thermistor which is disposed in the probe.

Another important aspect of the present invention has to do with the mode of operation. This device may be used either in a one-shot mode of operation wherein a person's temperature is to be taken only once, or can be used in a continuous mode of operation under special circumstances. For this type of operation there is provided a switch means which permits either continuous operation or operation over a predetermined time period at the end of which a temperature is registered and an audible alarm is sounded indicating that the reading may now be recorded by the nurse. In the continuous mode there is no audible signal and the temperature is continuously displayed in a strobed fashion. In order to provide this type of operation there is included in addition to the mode switch, a timer which may be in the form of a monostable multivibrator which in turn controls a bistable mode device. In one state this device permits continual resetting for the continuous mode of operation. In its other state which occurs after the monostable multivibrator has ended its time period, this device prevents further resetting and enables an audible and visual circuit for generating an audible and visual signal that indicates that the final reading has been taken by the device.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
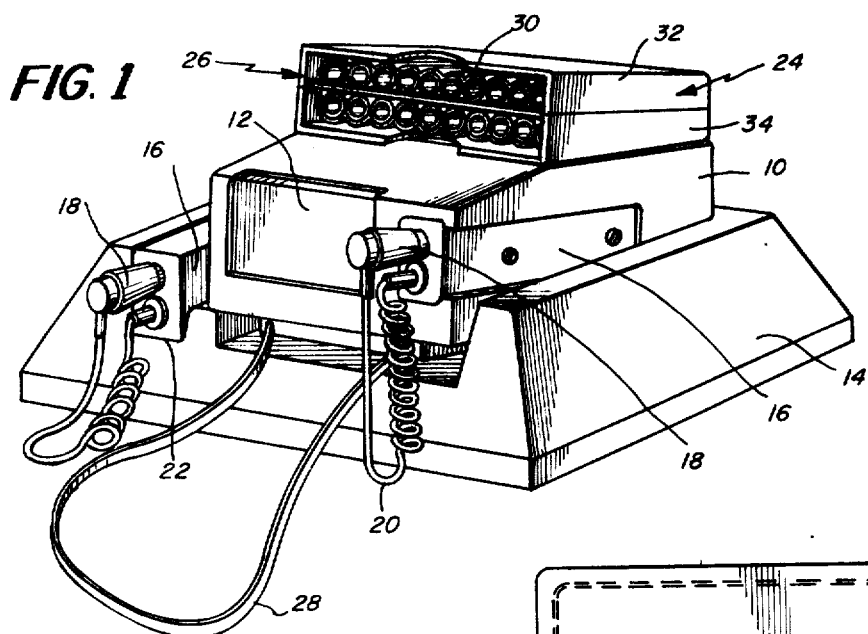
FIG. 1 is a perspective view of a device constructed in accordance with the principles of this invention.

Referring now to FIG. 1, there is shown the device of the present invention which is primarily contained within housing 10 having a digital display 12 at the front thereof. The device 10 sits upon a platform 14 which contains a recharger unit not shown in FIG. 1. This recharger unit may comprise a cord for receiving AC power and a recharger coil having a mating coil disposed in the device 10 for the purpose of charging batteries that are contained in the housing. This portion of the circuitry is discussed in more detail hereinafter with reference to the electronic schematic diagrams.

FIG. 1 also shows, inserted into the device 10, a probe holster 16 having the probe 18 inserted therein and partially extending therefrom. A silicone rubber curl-cable 20 couples from the probe 18 to an internal connection in the holster 16. Regarding the probe and holster shown in FIG. 1, more detailed reference will be made hereinafter to this portion of the invention shown in FIGS. 6 and 7.

The platform 14 also defines a recess 22 for receiving a second holster 16 and associated probe 18. One of the probe and holster assemblies may be for oral use and the other may be for rectal use. As is discussed in more detail hereinafter, the curl-cables associated with the holsters are each fixed within the holster and thus the probes cannot be exchanged between holsters.

Fig. 1 also shows, mounted to the top wall of the device 10, a holder 24 for holding a cartridge 26 of probe covers. In FIG. 1 a single holder 24 is shown. However, as noted hereinafter in FIG. 5, two such holders can be stacked one on top of the other to provide increased capability.

FIG. 1 shows the device of the present invention in a standby position wherein the device 10 is resting in the platform 14 and the device, or the batteries thereof, is being recharged for subsequent use. When a user, such as a nurse, is required to take a plurality of separate readings from patients, the device is removed from the platform and the proper holster and probe assembly is inserted into the device. As indicated in FIG. 1, the device is preferably provided with a comfortable neck strap 28 which can be used for carrying the device at approximately chest level and in easy viewing range. In this position it is also noted that the probe covers of the cartridge 26 are maintained in an upright position and because of the improved design of this cartridge these probe covers are fixed in position.

When a reading is to be taken the probe 18 is withdrawn from its holster 16 and inserted into one of the probe covers 30. The fit between the probe and the probe cover, as discussed in more detail hereinafter, is a friction fit and thus when the probe is withdrawn the cover is withdrawn therewith. After this operation the probe with the attached cover is inserted into the body of the person where the temperature is desired to be taken and as soon as a predetermined temperature of say 90° F is reached, a digital reading on the display 12 is noted. If the device is being used in the one-shot mode, after a predetermined time period of say thirty seconds, the display freezes at its last reading and an audible alarm is sounded to indicate to the nurse that this reading is to now be recorded. The probe is then withdrawn from the patient and the probe cover is discarded. The probe is then inserted into the holster and the device is then in readiness for the taking of a subsequent temperature.

Alternatively, if the device is being operated in the continuous mode, the probe is maintained in the patient and a digital reading is continuously displayed on the display 12.

Figure 2:
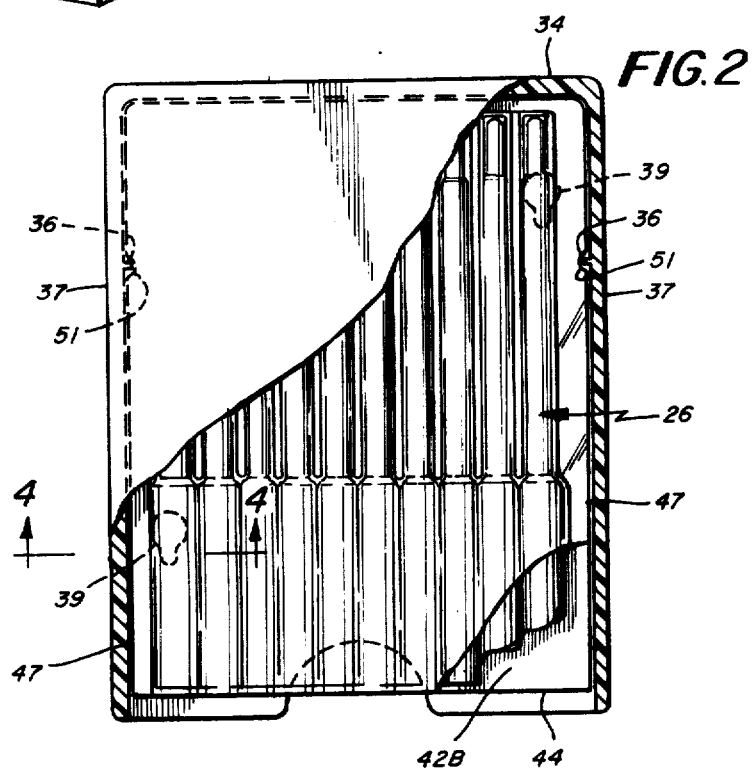
FIG. 2 is a cross sectional plan view taken through the probe cover cartridge holder.
Figure 4:
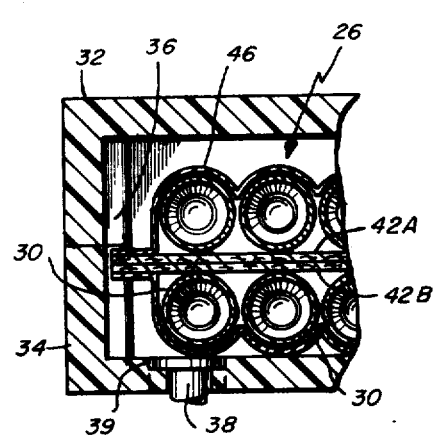
FIG. 4 is a cross sectional view taken along line 4—4 of FIG. 2 and through the complete holder and cartridge.
Figure 5:
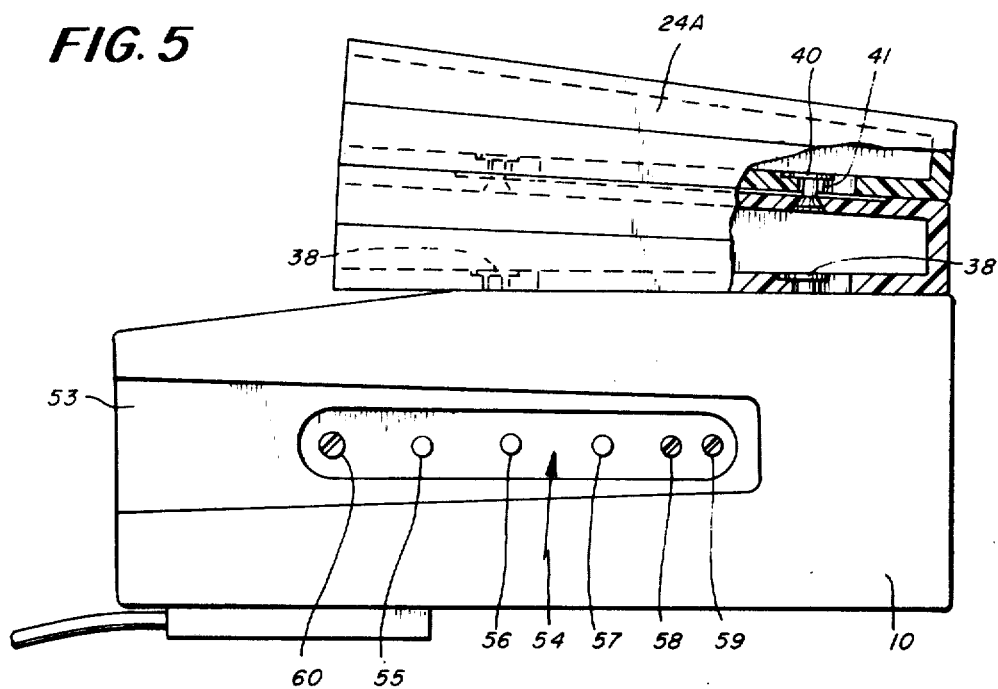
FIG. 5 is a side view of the device shown in FIG. 1 with the probe holster withdrawn to show the switch array.

Referring now to FIGS. 1–5, the holder 24 comprises top and bottom sections 32 and 34 which can be glued or spot fastened together to define a chamber for the cartridge 26. As indicated in FIG. 5, these sections 32 and 34 are slightly tapered. FIG. 2 shows the ridge 36 extending vertically from sidewalls 37 of the bottom section 34. Similar ridges are provided in the top section for interlocking the cartridge 26 into the holder 24.

The holder 24 is secured to the device 10 by means of a pair of posts 38 which extend upwardly from the top surface of the device 10 and engage with slots 39 in the bottom section 34, as indicated in dotted in FIG. 2.

Similarly, a second set of posts 40 may extend upwardly from the top section 32. These posts 40 are engageable with slots in a top holder 24A shown in FIG. 5. Actually, a greater number of holders can be stacked in the manner shown in FIG. 5 with the use of the post and slot arrangement.

Figure 3:
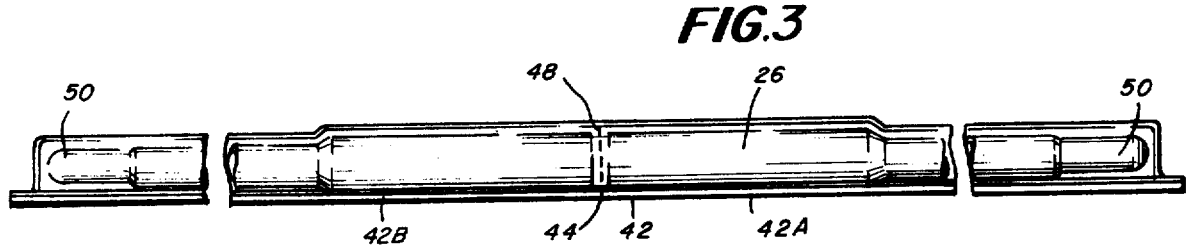
FIG. 3 is a side view of the probe cover cartridge in its unfolded condition.

The cartridge 26 comprises a cardboard backing 42 that has a perforation line 44 along which a fold may occur. This perforation line 44 divides the backing into sections 42A and 42B. A transparent plastic cover 46 defines with the backing 42 a plurality of individual probe cover chambers each of which contains a probe cover 30. The transparent cover 46 has a peripheral edge 47 which is secured such as by gluing to the backing 42. The transparent plastic cover 46 also has a perforation line 48. The cover 46 is continuously formed to define facing in line chambers for the probe covers and is closed at its opposite ends 50 as shown in FIG. 3.

When the nurse desires to use a new cartridge 26 which may be taken from a cartridge dispenser which is not shown in the drawings, the cartridge may be folded along either perforation line 44 or perforation line 48 to a folded condition shown in the fragmentary view in FIG. 4, and as is also shown in FIG. 1. Once this fold has taken place in either direction, the perforation line that has not been separated forms a hinge for maintaining the cartridge in a single piece. The folded cartridge is then inserted into the holder 24 and the probe covers and the entire cartridge are maintained locked in position at least in part by means of the notches 51 provided in the backing which mate with the ridges 36. By tapering the holder 24 this also assists in maintaining the cartridge and its probe covers in a relatively secure position in the holder. Once the probe covers have all been used the cartridge is collapsable and, as noted in FIGS. 1 and 2, the holder is provided with a front recess so that the cartridge can be easily withdrawn.

FIG. 5, in addition to showing the double stacking of the holders 24 and 24A, also shows the slot 53 which accommodates the holster 16 which has been withdrawn in the view shown in FIG. 5 to expose a switch array 54. The switch array 54 includes three calibration switches 55, 56 and 57. The operation of these switches will be discussed in more detail hereinafter with reference to the schematic diagrams shown in FIGS. 8-10. FIG. 5 also shows a gain control knob 58 and an offset control knob 59 which are also discussed in more detail hereinafter with reference to the schematic diagrams. The mode of operation of the device is controlled by control knob 60 which basically has two different positions, one of which provides one-shot or peak monitoring and the other one of which provides continuous monitoring. The function of this switch or control knob will also be discussed in more detail hereinafter.

Figure 6:
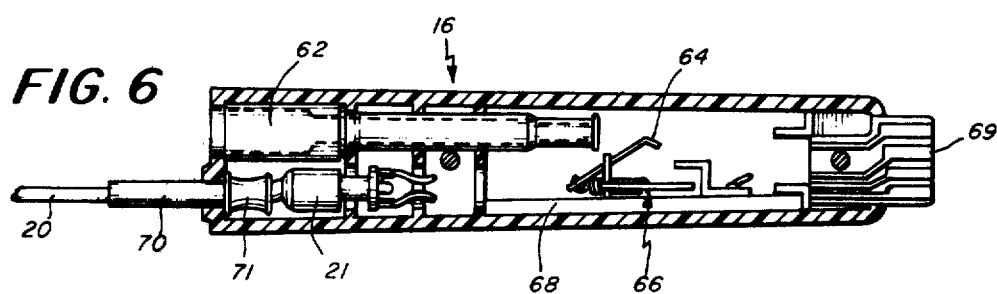
FIG. 6 shows the internal construction of the probe holster with half of the holster removed to expose the internal construction.

FIG. 6 shows the probe holster 16 with one-half of the housing defining this holster removed to expose the internal structure of the holster. When the removed section is placed over the half shown in FIG. 6, the components are maintained in a locked position. In FIG. 6 the probe 18 has been removed from the holster 16. The probe 18 is normally inserted into the metal tube 62 which has successive steps of smaller diameter. The tube 62 will line the probe up with contact 64 of switch 66 which is secured to a mounting plate 68. When the probe is in the holster, the switch 66 is in its open position and power is interrupted to the electronic circuitry of the device. Alternatively, when the probe is removed switch 66 is closed. FIG. 6 also shows the curl-cord 20 which couples by way of a standard connector 21 to the output printed circuit board connector 69. There are two leads coupled from the connector 21 to the circuit board 69 and there are also two additional leads coupled from the switch 66 to the board 69. The connector board 69 is of special construction in that connections are made to both sides of the connector board so that the holster can be inserted in one of two different positions without changing the electrical connections.

One of the important features of the present invention is the use of this holster which accommodates only the probe associated therewith. To provide this operation the cable 20 has a sleeve 70 with a flange 71 associated therewith. When the two halves of the holster 16 are assembled, the flange 71 prevents the cable 20 from being withdrawn from the holster at that end. Another important feature of the holster and probe assembly is that the entire assembly is autoclavable without having to sterilize the entire device. Also, with the use of a tube 62 the probe cannot be inserted into the holster 16 when a probe cover is attached to the probe. In the prior art devices the probe with a probe cover attached thereto could be inserted back into the device and thereby cause further infection and contamination.

Figure 7:
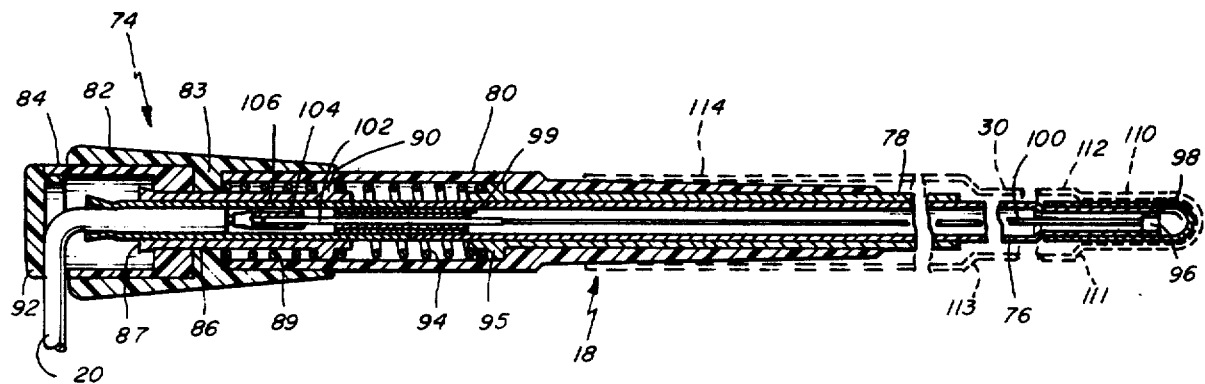
FIG. 7 is a somewhat enlarged cross sectional view of the probe with the probe cover in place.

FIG. 7 shows a cross sectional view of the probe with a probe cover in place on the probe. The probe 18 shown in FIG. 7, generally comprises finger grip assembly 74, elongated tubular probe 76, barrel 78, barrel 80, and cable 20. The finger grip assembly 74 comprises base member 82 defining a mid-wall 83. A cylindrical member 84 which is made of plastic fits within one end of member 82 and abuts against wall 83. A metallic tube 86 passes through a central aperture in members 82 and 84 and is flanged at 87. Before assembling these parts a spring 89 is placed between wall 83 and annular flange 90. The tubular piece 86 and the cylindrical member 84 move in unison and relative to the finger grip member 82. An end button 92 may be secured in place over the end of the cylindrical member 84.

The metallic tubular probe 76 may pass through the aperture in the tubular member 86. A second spring 94 is disposed contacting the flange 90 and at its other end contacting flange 95 of the tubular barrel 78. The barrel 80 may then be inserted over the tubular probe 78 and fits within the other end of the finger grip member 82. The barrel 80 and member 82 may be fixed in relative position by means of an epoxy glue. As previously mentioned, the probe also comprises the elongated tubular metal probe member 76 which has a thermistor 96 disposed at one end thereof. This thermistor is covered by a small metallic cap 98 which closes that end of the tubular probe 76. At the other end of the tubular probe there is provided a hermetic seal which may be a glass to metal seal 99. A conductor wire 100 couples from the thermistor inside of the tube to a somewhat larger rod 102 which is insulated by means of seal 99 from the outer metal tubular probe.

The cable 20 has a connector coupled to the end thereof which is a conventional connector and there is provided a segment 106 of tube of approximately the same diameter as tubular probe 76 which fits over the connector 104. One terminal of the connector couples to the rod 102 and the other terminal of the connector is wound to contact the segment 106 which is in turn in conductive contact with the tubular probe 76.

FIG. 7 also shows the probe cover 30. The probe cover 30 includes a first segment 110, which in the position shown in FIG. 7 is in intimate contact with the cap 98 of the tubular probe 76. The segment 110 and the cap 98 are constructed so that there is a slide fit and when the probe cover is inserted onto the probe this slide fit provides sufficient friction to hold the probe cover onto the probe. The probe cover shown in FIG. 7 is constructed entirely of metal and is coupled by means of a frustoconic section 111 to a second segment 112 which has an internal diameter that is greater than the diameter of the tubular probe 76, thereby providing an air passage therebetween. The second segment 112 is connected by means of another frustoconic section 113 to a third segment 114 which is open at its end. The segment 114 is of larger diameter than segment 112 and is adapted to fit over the barrel 80, as indicated in FIG. 7.

In operation, when the cover is forced onto the probe by inserting the probe into the cover, springs 89 and 94 compress and are held in compression by the friction fit at the surface between segment 110 and cap 98. When the cover is inserted the button 92 is urged outwardly from the finger grip assembly 74. In order to release the probe cover the button 92 is depressed thereby causing springs 89 and 94 to act. Springs 94 and 89 which were previously under compression then release and the probe cover is ejected from the probe. Barrel 78 and spring 94 advance the cover away from probe 76 beyond ridge 111 thus allowing venting and full release of the cover from the probe. The shank 78 when relaxed also provides the feature of protecting the thin-walled probe 76 from bending or collapsing accidentally. The spring action is such that by depressing the button 92, the friction fit between the segment 110 and the cap 98 is broken. Because the segment 112 is made larger than the probe, there is no vacuum that is created and the probe cover easily disengages from the probe.

The probe cover of the present invention is believed to be an improved design. For one thing, because of the stepped arrangement of this probe cover it is easily releasable from the probe. The probe cover is preferably made from all aluminum and is disposable. The three segments of the probe cover may have diameters on the order of 0.115 inches, 0.165 inches and 0.250 inches, respectively. The probe cover provides a fast thermal response, is comparatively economical, is shaped with no sharp corners that might cut or otherwise injure soft tissue, is made from non-toxic material and is substantially safer then two-piece probe covers which may on occasion separate when in use. If desired the probe cover may be coated.

Figure 8:
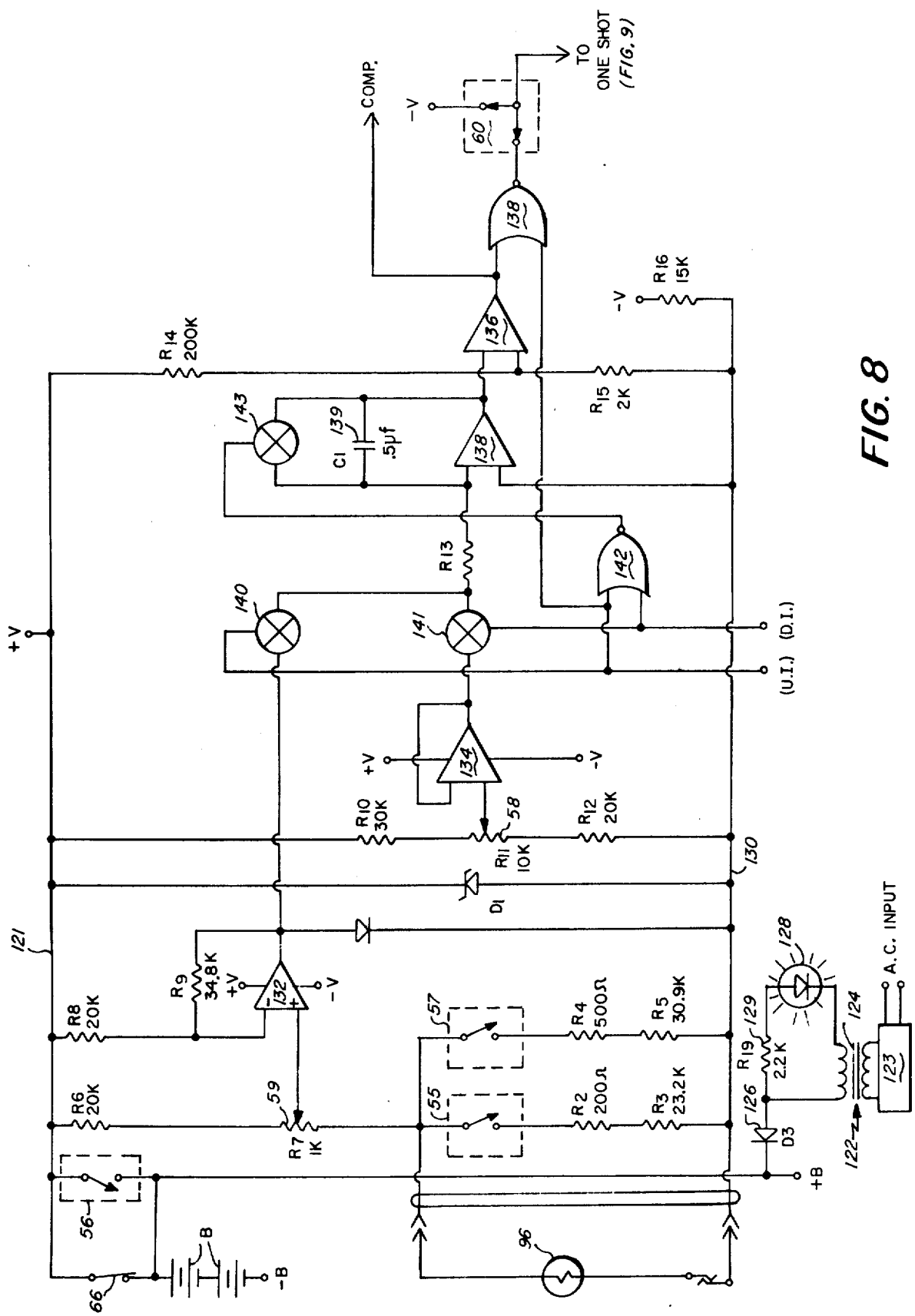
FIGS. 8–10 are electrical schematic diagrams of the electronics associated with the device of this invention.
Figure 9:
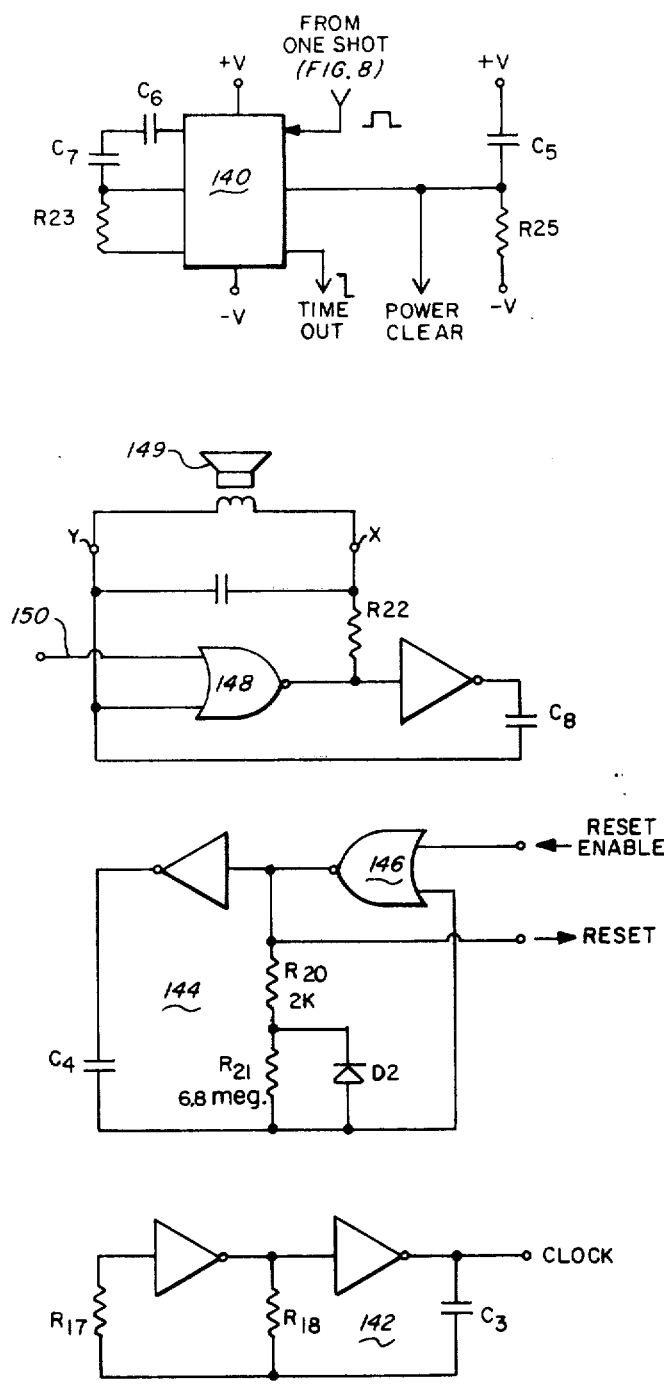
Figure 10:
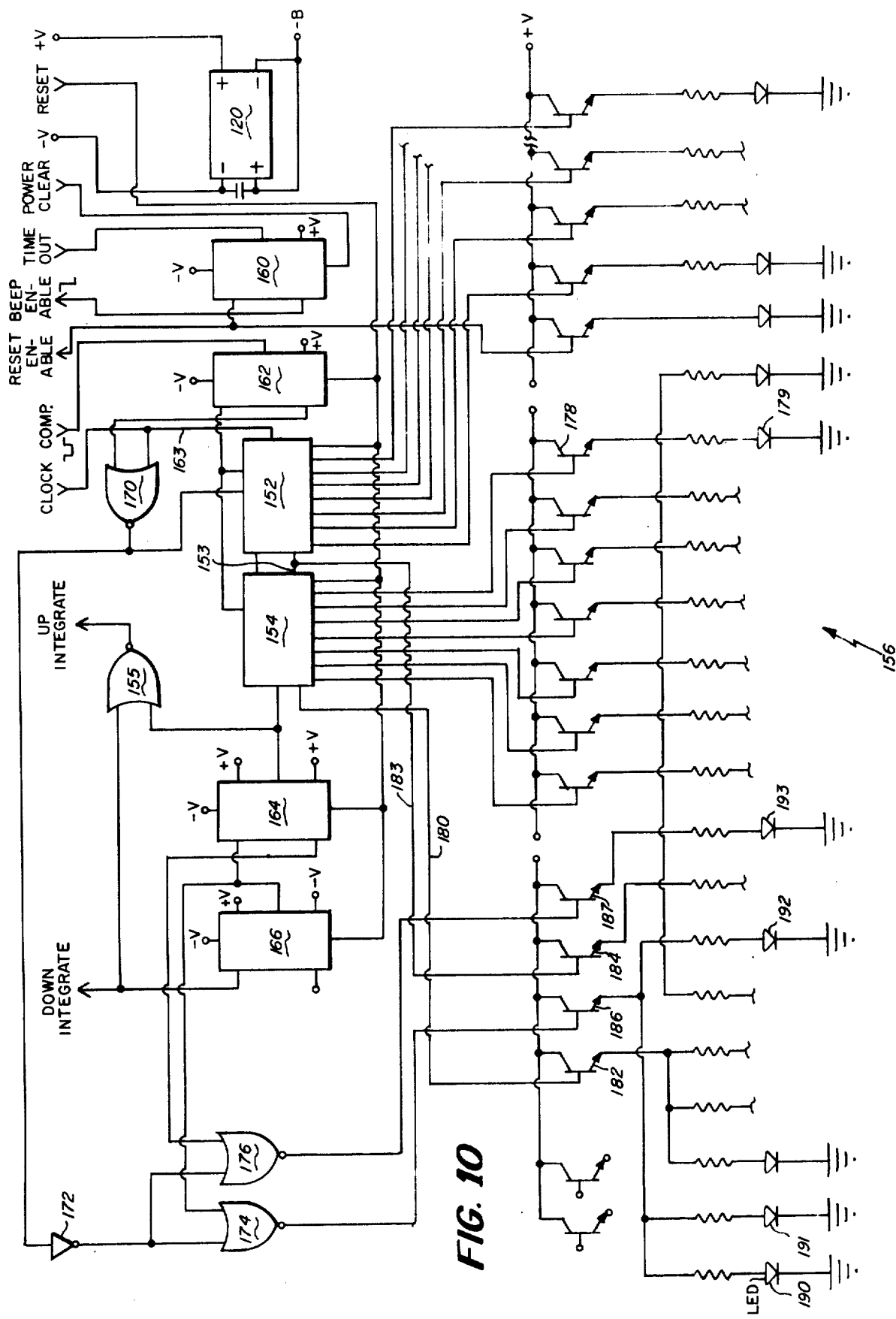

FIGS. 8-10 show the circuitry that is associated with the electronic thermometer of this invention. FIG. 8 shows the analog circuitry including comparison circuitry. FIG. 9 shows some of the timing circuits associated with the electronics. FIG. 10 shows the digital counting circuitry, the control circuitry and the coding and display driving circuitry.

Referring now to FIG. 8, there is shown the batteries B which have their negative terminal coupled to the converter 120 shown in FIG. 9. This converter 120 is of standard design and simply converts the battery voltage to predetermined voltage levels +V and —V. Battery B couples by way of switch 66 to the +V line 121. The batteries are charged by means of a recharger circuit 122 which receives an input AC signal which is coupled to the frequency converter 123. The output of converter 123 is a higher frequency signal than the typical 60 cycle signal and this signal is coupled by means of transformer 124 and diode 126 to the batteries. A light emitting diode 128 is coupled in series with resistor 129 and both of these are in parallel with the secondary winding of the transformer 124. When the device 10 is in the position shown in FIG. 1 an inductive recharging occurs by way of transformer 124 and the light emitting diode 128 is lit. Diode 128 is visible in the display 12 and indicates that the batteries are being recharged. When the device is lifted from the recharger platform 14 the diode 128 is extinguished.

When the probe and holster assembly is inserted into the device, such as in the position shown in FIG. 1, and when the probe is still in the holster, the switch 66 is open and because switch 56 is also normally open there is no power provided to the circuitry shown in FIGS. 8-10. However, when the probe is withdrawn from the holster the switch 66 closes and power is provided on line 121 and to other portions of the circuitry. When the probe and holster assembly is not in the device then the switch 56 may be operated to enable the device and take non-probe temperature readings.

FIG. 8 shows the thermistor 96 coupled to common line 130 and also to the off-set potentiometer or knob 59. The wipe arm of the potentiometer 59 couples to operational amplifier 132 which has appropriate biasing resistors associated therewith. In order to check the accuracy of the system there is also provided switches 55 and 57 which are normally open but may be closed to insert predetermined resistances in series with potentiometer 59. The off-set potentiometer 59 is also controllable as indicated in FIG. 5 to adjust this calibration. The resistor associated with switch 55 is preselected to indicate a minimum point of expected operating range such as a temperature of 90° F. Alternatively, the switch 57 is in series with a resistor that is preselected to operate at an upper limit of the range such as at 108° F. These two switches should be used periodically to check the accuracy of the readings to see that the off-set is set for this predetermined temperature range.

FIG. 8 also shows a second amplifier device 134 which has an input coupled from the gain potentiometer 58. The output of device 134 establishes a set reference level which is used in the analog digital converter.

The analog digital converter is of the up-down converter type. For example, this may be a converter such as the one shown in Analog to Digital Digital to Analog Conversion Techniques by David F. Hoeschele, Jr., specifically as shown on pages 381-384. The basic idea of the up-down converter is to generate a pulse width proportional to the analog input voltage by making a time comparison between two integrations. The proportional pulse width is taken at the output of the comparator 136, shown in FIG. 8. The first integration is on the input analog signal. It proceeds for a fixed interval of time and the input to the integrating circuit is then switched to a known reference voltage. The time from this switching until the integrator output reaches the initial fixed reference point provides a measure of the analog input voltage. This sequence of operation is referred herein as the up integrate (UI) and down integrate (DI).

Figure 11:
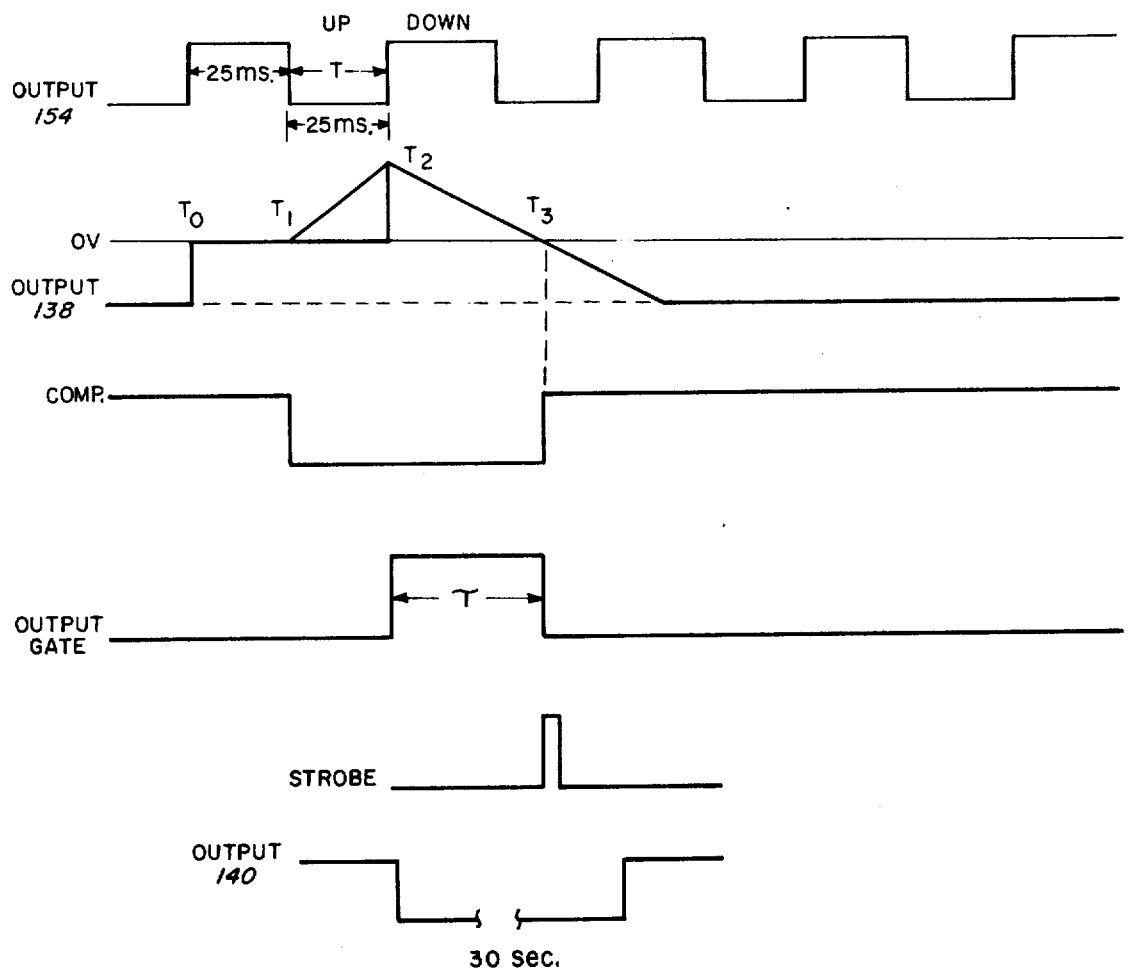
FIG. 11 shows waveforms associated with the diagrams in FIGS. 8–10.

The analog digital converter comprises, in addition to comparator 136 an integrator 138 having a capacitor 139 associated therewith, electronic switches 140 and 141 and NOR gate 142. The UI and DI signals control the switches 140 and 141 and the gate 142. The output of gate 142 in turn controls a third switch 143. In the sequence of operation to be discussed in more detail hereinafter, the UI and DI signals are both initially low causing conduction of switch 143 and a discharge of capacitor 139 prior to the initiation of an up integrate sequence. Thereafter, an up integrate sequence occurs and switch 140 is rendered conductive with the signal from device 132 being coupled to the integrator 138. Thereafter during the down integrate sequence, the switch 141 is conductive to couple with signal from device 134 to the integrator 138. The output from integrator 138 couples to one input of comparator 136. The comparator 136 has an output as indicated in FIG. 11 which is normally high and goes to its low state when the integrator output is of sufficient positive value. The circuitry shown in FIG. 8 is arranged so that this comparison does not take place until the thermistor 96 registers a reading of at least 90° F. The adjustment of the off-set is instrumental in controlling this comparator output. Of course, the total operation of the analog to digital converter shown in FIG. 8 is dependent upon the UI and DI signals which are control signals. The output from comparator 138 is referred to as the COMP signal shown in FIG. 11 and is coupled to the control logic shown in FIG. 10. The output from comparator 136 also couples to NOR gate 138 which receives another input which is actually the UI signal. The output from gate 138 is also shown in FIG. 11 and is coupled to the mode control switch 60. The switch 60 is shown in solid in its one-shot mode of operation and is shown in phantom in its continuous mode of operation. In the one-shot mode of operation the output from gate 138 is coupled to the monostable multivibrator 140, shown in FIG. 9. In the continuous mode of operation switch 60 couples the input of the multivibrator directly to the −V voltage level.

The monostable multivibrator 140 shown in FIG. 9 may be adjusted to provide different time periods at its output. FIG. 11 shows the typical 30 second output of the multivibrator 140 which is termed the TIME OUT output. This output is coupled to the logic circuitry shown in FIG. 10 and this 30 second interval represents the time over which the temperature is taken. Because the comparator 136 does not have an output until 90° this 30 second interval represents an interval of 30 seconds from the time that the probe first senses a 90° F reading. The multivibrator 140 is a standard design and has an output that is low during the 30 second interval. The multivibrator 140 also generates a power clear signal which is a positive pulse used primarily in the circuitry of FIG. 10 as a set pulse.

FIG. 9 also shows the master clock 142 which is of conventional design and has its resistors and capacitors selected so that the output frequency from the clock is 1KHz or thereabouts. The reset clock 144 also shown in FIG. 9, is similar in design to the master clock 142 but includes an enabling gate 146. When the reset enable signal, which is coupled from the circuitry of FIG. 10, is low the reset clock is enabled and reset pulses occur at a predetermined time period. In accordance with one aspect of this invention the reset clock is adjustable to provide a reset pulse every half second. This reset signal is in essence an update signal meaning that every half second the analog data is updated. Thus, in the one-shot mode of operation there are approximately sixty resets that occur during the 30 second interval until a final probe reading is registered.

FIG. 9 shows a further clocking circuit 148 which is referred to as the beep or audible circuit. This is an oscillator that has an audible signal device 149 coupled thereto. When the input enable line 150 goes to its low state the oscillator is enabled and an audible signal is generated by the signal device 149. The circuit 148 and the reset clock 144 are operated mutually exclusively so that as long as resets are occurring there is not an audible signal occurring. After the end of the reset interval in the one-shot mode of operation then the reset clock is inhibited and the beep circuit is enabled.

FIG. 10 shows much of the control logic that is used in controlling the analog to digital conversion and which also controls the counters 152 and 154. Each of these counters is of conventional design and include a count enable input, a strobe input and a clocking input. The counters 152 and 154 are interconnected so that they in essence form a single sequencing binary counter. The counters 152 and 154 are only permitted to count when the clock enable input is at its low level. The output from the counters is coupled to the drivers and display 156 which comprise transistor drivers and light emitting diodes forming seven segment characters. Actually, the counters 152 and 154 also comprise decoding which provides the proper outputs for driving the light emitting diodes to form the proper decimal characters corresponding to the binary count in these counters.

The operation of the electronics is initiated by withdrawal of the probe from the holster. When that occurs power is immediately provided and the power clear signal sets the flip-flop 160. In this condition its assertion output is low and thus the reset clock shown in FIG. 9 is enabled. Thereafter, a reset signal from the clock 144 occurs and this signal resets the counters 152 and 154 and also the other flip-flops 162, 164 and 166. The flip-flops 164 and 166 are J-K toggle flip-flops. The reset signal which resets flip-flop 162 causes its assertion output to be low thus enabling the counters 152 and 154. This action initiates the clocking sequence and the clock pulses are coupled to the counter by way of line 163 from the clock input from the master clock 142. This initiation of the counters is indicated in FIG. 11 as occurring at time $T_o$.

On the occurrence of the reset the output from the counter 154, shown in FIG. 11, is at its high state commencing at time $T_o$, and this signal is coupled by way of NOR gate 155 to the circuitry shown in FIG. 8. The signal that is coupled is the UI signal which is low during the time that the output from counter 154 is high. The DI signal at the output of flip-flop 166 is also low and thus the gate 142 shown in FIG. 8 has a high output causing a discharging of the capacitor 139. This discharge sequence is an initial sequence prior to the up integrate sequence.

The up integrate sequence commences when the counter 154 output goes to its low state thereby providing a high level output from the gate 155. This starts the up integrate sequence with switch 140 being conductive (see FIG. 8). FIG. 11 shows the up integration during a predetermined time period which may be on the order of 25 milliseconds. At the end of this time period the output from the counter 154 at time $T_2$ goes to its high level inhibiting the up integration. This high level signal in sequence clocks both flip-flops 164 and 166 and starts the down integration by virtue of a high level DI signal.

During the time from $T_1$ to $T_2$ the comparator 136 is indicating an output and if it is assumed that switch 60 is in its continuous mode position the flip-flop 160 is maintained in its set state and the reset clock is continuously enabled. There is no termination of the up dating. Also, it is noted that the COMP signal is low and thus the flip-flop 162 is maintained reset.

After a predetermined time period indicated in FIG. 3 as occurring at time $T_3$ the comparator output 136 terminates as indicated in FIG. 11 and the flip-flop 162 sets. When this occurs the counter enable signal terminates and the counters can no longer count upon the receipt of clock pulses. Also, the negation output from flip-flop 162, along with the proper polarity clock pulse provides a positive strobe pulse at the output of NOR gate 170. This strobe signal is passed by way of an inverter 172 to two further NOR gates 174 and 176. The output from gate 170 is also coupled to the counter 152 and from there by way of line 153 to counter 154. This strobe signal essentially enables the decoded output from the counters which then drive the appropriate transistors 178 and LED's 179 comprising a part of the driver and display 156. This strobe signal is also coupled by way of counter 154 and line 180 to transistor 182 which operates three segments of a digit. This strobe signal is also coupled on line 183 to transistor 184 for lighting certain other segments of the same digit.

Because the temperature range as far as the most significant digit is concerned will be either a 9 or 10, only a few segments of the character 9 need be changed to convert the 9 to 0. Also, the character 1 can be represented by only two segments. The gates 174 and 176 along with the transistors 186 and 187 control these different segments to illuminate either a 9 or a 0.

Thus, at time $T_2$ when we start the down integrate, the flip-flop 164 may again be reset if the temperature is over 100° F. In that case the gate 174 has a high enabling output and transistor 186 drives two segments 190 and 191 for displaying the character 1. Also, this transistor 186 drives a third segment 192 for completing the character 9. Alternatively, if a reading of less than 100° is registered then the gate 176 is enabled as the flip-flop 164 did not become reset. In that case the transistor 187 is enabled for driving a segment 193 to complete the 9 character.

For the time being we are assuming that we are operating in the continuous mode of operation and thus after the conversion has occurred with the up and down integrate sequence the counters are maintained inhibited until the next reset pulse occurs at which time flip-flop 162 is reset and the counters are again enabled. The sequence then repeats with a new digital number being displayed based upon the new analog signal level. In this invention the strobe signal is a pulse signal as shown in FIG. 11, but is of relatively short duration, and thus the display is displayed in a flash mode rather than a continuous mode of display, with the strobe flashes occurring at the clock rate.

In the one-shot mode of operation the switch 60 is in the position shown in solid in FIG. 8 and the signal from gate 138 is coupled to the monostable device 140. After this device has timed out over a period of say 30 seconds, as indicated in FIG. 11, this causes the flip-flop 160 to become reset. The negation output of the flip-flop 160 thus becomes high and inhibits any further reset pulses from the reset clock 144. At the same time the assertion output from the flip-flop 160 is low and thus the beep circuit 148 is enabled. Thus, after the 30 second time interval the displayed reading is maintained and the beep circuit indicates that the reading has been concluded and can now be recorded.

What is claimed is:

1. A probe cover for a probe of a medical electronic thermometer, wherein said probe has a substantially uniform diameter cylindrical shape along its length including a cylindrical tip at one end containing a sensor, said probe cover comprising an elongated hollow metal sleeve of uniform thickness along its length closed at one end and open at the other end, and having successive first, second and third segments with said first segment extending from said one end having the same circular cross section along its length and having an internal diameter dimensioned just larger than but close to the diameter of the cylindrical tip of the probe to provide a frictional slide fit between said first segment and said cylindrical tip, said second segment having the same circular cross section along its length and having an internal diameter greater than the diameter of said first segment and also greater than the diameter of said probe by an amount at least on the order of the thickness of the cover for providing a cylindrical air passage to said first segment when the cover is fitted on the probe, and said third segment having the same circular cross section along its length and having an internal diameter greater than the internal diameter of said second segment, said first, second and third segments of said sleeve all being constructed of a like metal material and being integrally formed.

2. A probe cover as set forth in claim 1 wherein frustoconic sections are integrally formed between said first and second and between said second and third segments.

3. A probe cover as set forth in claim 1 wherein said metal sleeve has a uniform thickness of substantially 0.006 inches.

4. A probe cover as set forth in claim 3 wherein said internal diameter of said first segment is substantially 0.155 inches, said internal diameter of said second segment is substantially 0.165 inches and said internal diameter of said third segment is substantially 0.250 inches.

5. A probe cover as set forth in claim 1 wherein said first segment defines a closed tip for the probe with the first segment and closed tip both having a uniform thickness and being integrally formed of the same metal material throughout.

6. A probe cover as set forth in claim 1 wherein said probe has a barrel thereabout at an end of the probe opposite the cylindrical tip of the probe, said barrel having a taper for engaging inside and with the open end of the third segment of the probe cover.

* * * * *